INVENTOR,
HERBERT B. VOELCKER JR.
BY
Harry M. Saragovitz
ATTORNEY

INVENTOR,
HERBERT B. VOELCKER JR.
BY Harry M. Saragovitz
ATTORNEY.

INVENTOR,
HERBERT B. VOELCKER JR.
BY Harry M. Saragovitz
ATTORNEY.

Oct. 16, 1962 H. B. VOELCKER, JR 3,059,188

APPARATUS AND METHOD FOR LINEAR SYNCHRONOUS DETECTION OF DIGITAL DATA SIGNALS

Filed Oct. 3, 1958 4 Sheets-Sheet 4

*INVENTOR,*
HERBERT B. VOELCKER JR.

BY *Harry M. Saragovitz*

ATTORNEY.

United States Patent Office 3,059,188

Patented Oct. 16, 1962

3,059,188

APPARATUS AND METHOD FOR LINEAR SYNCHRONOUS DETECTION OF DIGITAL DATA SIGNALS

Herbert B. Voelcker, Jr., Tonawanda, N.Y., assignor to the United States of America as represented by the Secretary of the Army Filed Oct. 3, 1958, Ser. No. 765,263
6 Claims. (Cl. 329—123)
(Granted under Title 35, U.S. Code (1952), sec. 266)

The invention described herein may be manufactured and used by or for the Government for governmental purposes, without the payment of any royalty thereon.

This invention relates to electronic communication systems for digital data in which noise and propagation disturbances have caused difficulty in reception. If the signal frequency (or frequencies) and even the phase and the pulse duration and even the transition time can be reliably predicted, it is possible to obtain the maximum signal with the minimum distortion due to noise since only noise components corresponding in frequency and phase and in pulse duration and transition time to the actual signal of interest will have any effect in the receiver. Because of many variables in equipment and propagation media, the actual signal received often varies from what would be expected, particularly in regard to phase. The present invention provides for the accurate adjustment of a receiver to follow each of the precise characteristics of a signal to reduce the detrimental effects of noise and variations in propagation to a minimum. These effects occur in various types of signals but the solutions will be illustrated in connection with phase reversal and frequency shift keying as applied to teletype data transmission.

Figure 1:
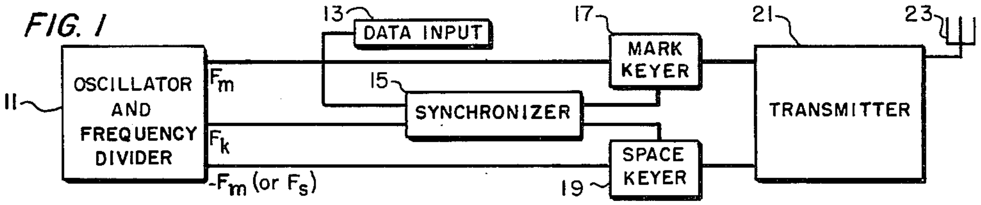
Figure 2:
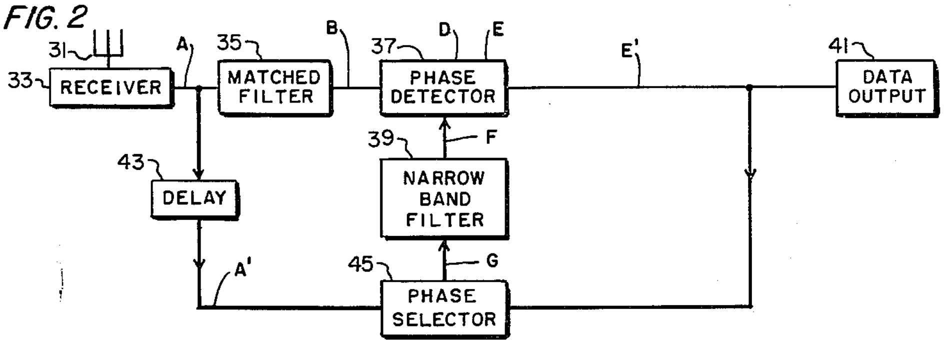
Figure 2A:
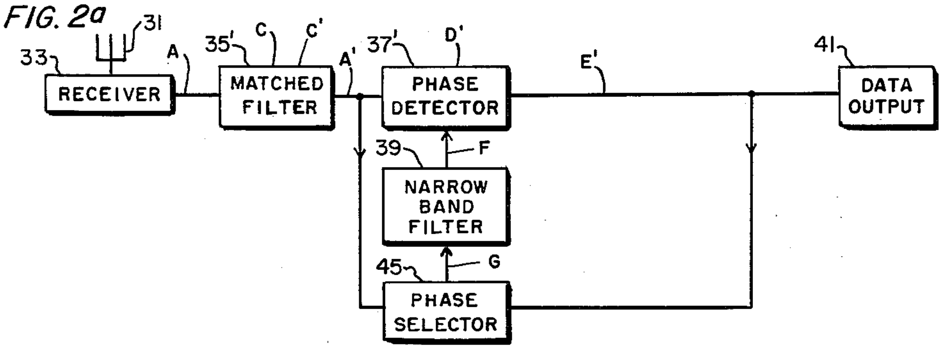
Figure 3:
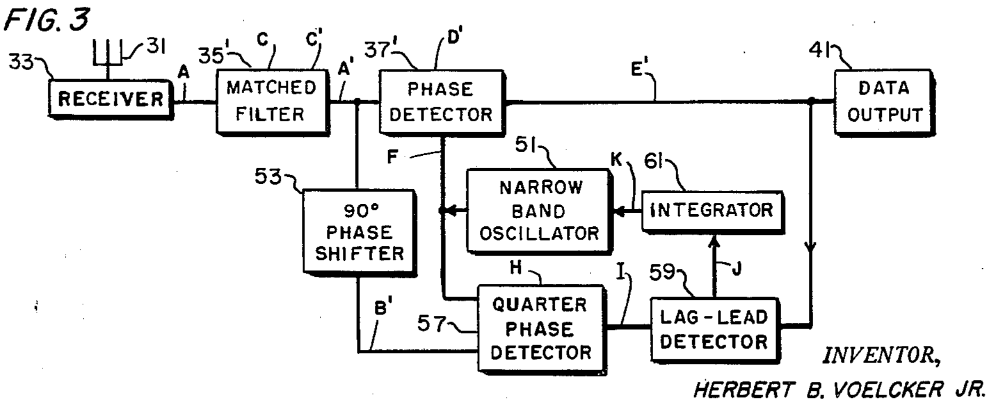
Figure 4:
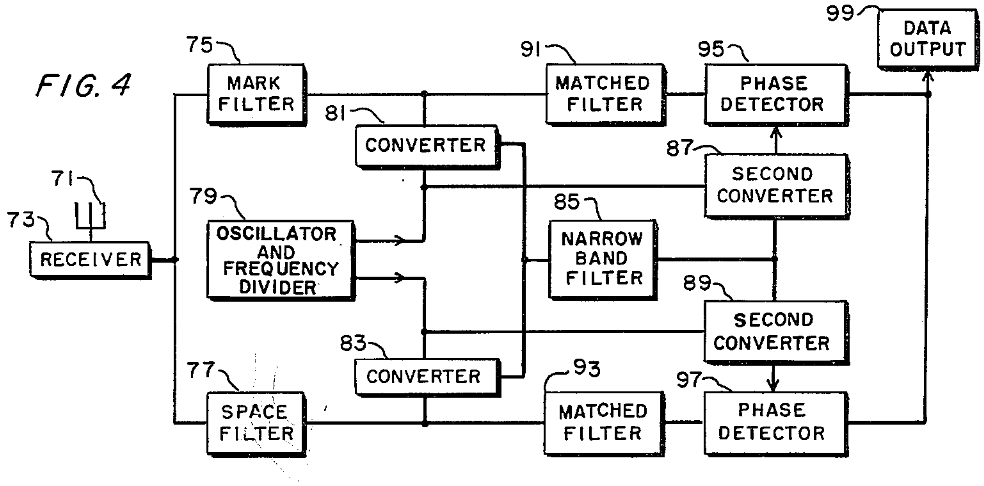
Figure 5:
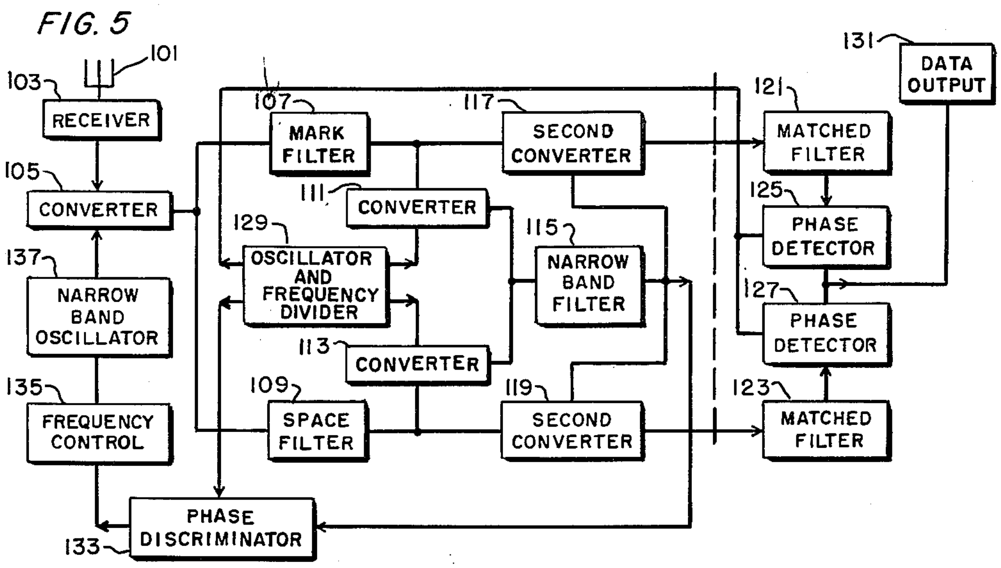
Figure 5A:
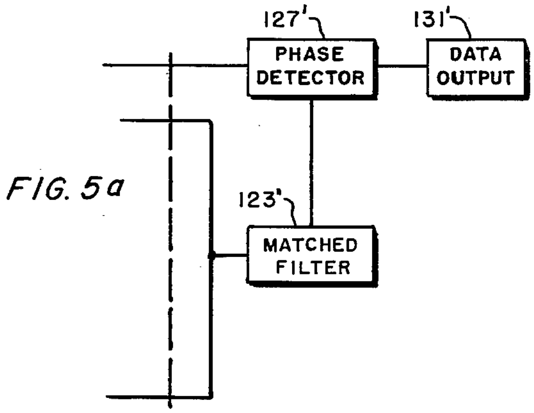
Figure 6:
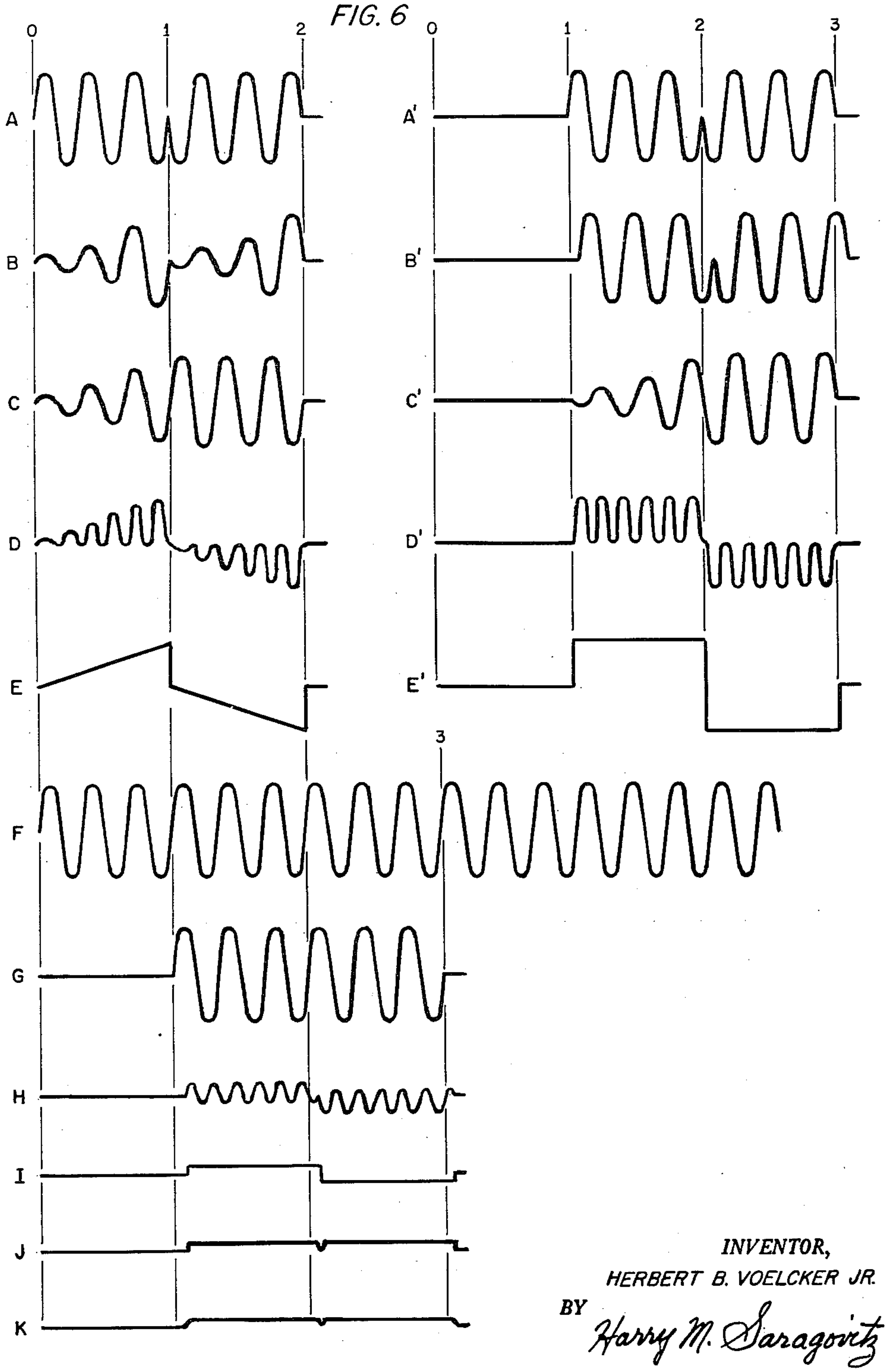
Figure 7:
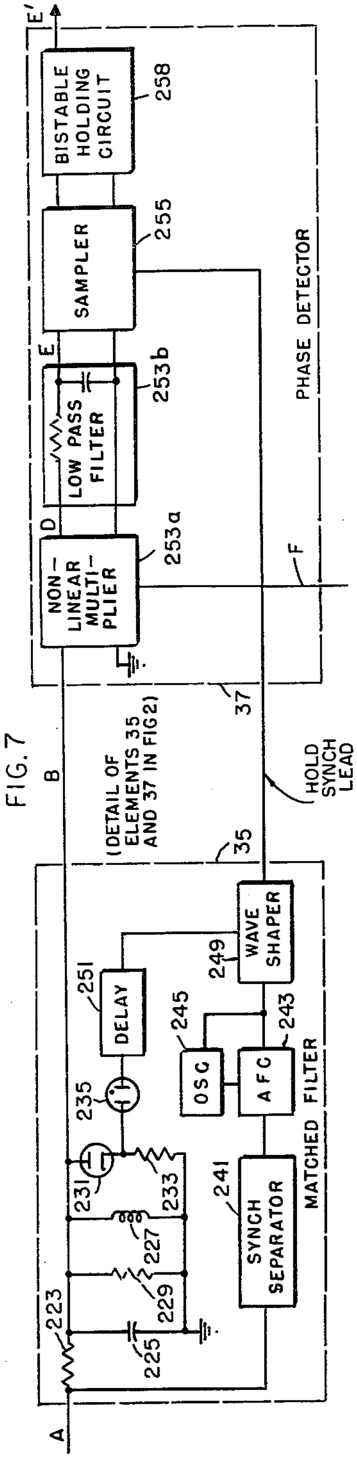
Figure 8:
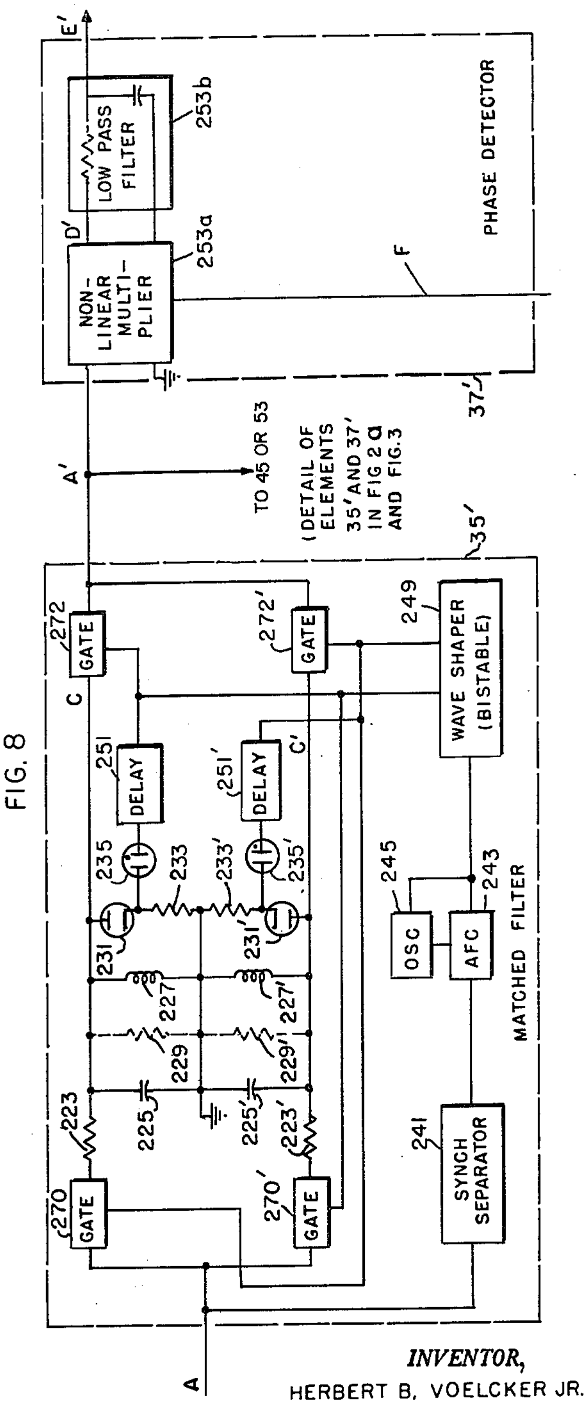

The necessary techniques to minimize the difficulties in such systems are illustrated in connection with the accompanying drawings, in which:

FIG. 1 illustrates a typical transmitter for the types of signals to which the invention is applicable;

FIGS. 2, 2*a*, and 3 illustrate receivers for phase reversal keying in accordance with the invention;

FIGS. 4, 5, and 5*a* illustrate receivers for frequency shift keying in accordance with the invention;

FIG. 6 illustrates many of the waveforms involved in various applications of the invention; and FIGS. 7 and 8 illustrate two forms of matched filter and the appropriate phase detectors for practicing the invention.

In FIG. 1 an oscillator and frequency divider 11 provides several output voltages, a rather low frequency keying signal $F_k$ to establish the pulse duration and actual transition time, a moderate frequency signal $F_m$ to be transmitted during periods considered as "marks," and another moderate frequency signal to be transmitted during periods considered as "spaces." In the case of phase reversal keying the latter would be of the same frequency but opposite phase, designated $-F_m$, while in frequency shift keying it would be of another frequency $F_s$ differing from $F_m$ by several cycles during each mark or space period. To minimize transients the keying signal $F_k$ preferably is so related to the other signals that transition occurs at the null point of the moderate frequency waves $F_m$ and $F_s$. In view of the digital nature of the information the change from one state to another occurs at the transition time, altho such change would not actually occur at every transition time since successive pulses very frequently would be alike rather than different according to the particular code and information. The data input 13 is connected through synchronizer 15 with the signal $F_k$ to be sure the data transition time is correct. The outputs so corrected are supplied to the mark keyer 17 and space keyer 19 for applying the appropriate mark or space signals to the transmitter 21. Normally the transmitter would convert the signals to a much higher frequency range for transmission by the antenna 23. The nature of the pulse signals is predetermined rather precisely (1) by the design of the equipment as to their frequency and length, and (2) by many previous received signals as to their synchronization or timing, generally termed "phase" regarding such frequency and "transition time" regarding such length (the reciprocal of the pulse repetition frequency or rate, assuming any time to accomplish each transition as part of the pulse "length").

In FIG. 2 the high frequency signals reach antenna 31 and pass to receiver 33 which normally would convert the signals back to a moderate frequency range. Such signals are then supplied to two loads simultaneously. In matched filter 35, tuned to the signal frequency and arranged to integrate the signal over each mark or space period, the signal-to-noise ratio is improved as more fully described, for example, in relation to the filter 11 and its synchronizing control circuits in John M. Wozencraft application for Active Filter, Serial No. 495,833, filed March 21, 1955 (issued March 31, 1959, as Patent No. 2,880,316). The expression "matched filter" is used to identify a circuit responsive to a signal complying with several requirements (the proper signal frequency and also the proper duration and transition time) necessary to actuate the output, thereby improving the signal-to-noise ratio; the particular matched filter corresponds to the entire circuit to the left of the detector 53 in Wozencraft, although many are even more complex. The output is then supplied to a phase detector 37 together with a signal of similar frequency and phase from narrow band filter 39. The output of filter 39 is a signal corresponding in frequency and phase to the frequency and usual phase of the signal from filter 35, and therefore serves as a local source of phase controlled signal. Therefore phase detector 37 further reduces any output which might result from random noise excitation of the matched filter. The phase detector provides the data output 41 corresponding to the square wave (mark or space) data input in FIG. 1, which clearly distinguishes reversals of phase of the matched filter output relative to the narrow band filter output but is rather insensitive to minor variations of phase since in-phase components of nearly adjacent or opposed vectors are dependent on the cosine of the lag or lead angle, remaining nearly unity until the angle becomes fairly large. The phase detector involves the usual balanced modulator circuitry, providing a "multiplication" of sine-wave voltages shown by trigonometry to produce sum and difference frequency components, and low-pass filter circuitry (often a mere capacitor used with the inherent resistance of the balanced modulator circuitry, analogous to the capacitor used with the diode of the elementary detector 53 of Wozencraft) to eliminate the sum frequency and preserve the difference frequency, considered as zero frequency or D.C. within each pulse of the teletype wave.

The Wozencraft device is described on the basis of a single filter short-circuited at each pulse period. Such a circuit is illustrated in FIG. 7 including the same components as in Wozencraft and designated by the same reference numerals prefixed by a "2"; the detector is included also, in this case a phase detector, with a holding circuit as noted below. This provides a suitable signal for the phase detector but in order to have an actual rectangular output wave it would be necessary to include a storing or flip-flop circuit. In Wozencraft this is provided in the output of the detector as a sampling (gating) relay 55 and bistable holding circuit 58; another suitable storing circuit might involve the use of a pair of filter elements in the matched filter, one integrating a received signal while the other oscillates freely to provide a fairly steady output, which would be shorted after delivering such output. The same synchronizing means used by Wozencraft for shorting one filter at each pulse could control both the alternate shorting and switching for a pair of filters. Such a circuit is illustrated in FIG. 8, the filter elements and shorting gate being merely duplicated. Because of the need for gating or switching analogous to that often used with oscilloscopes, the wave shaping networks would also provide dual outputs for the filter element input gates 270 and 270', output gates 272 and 272', and shorting gates 231 and 231'. In this case a holding circuit for the detector output would be entirely superfluous.

To maintain and correct the phase of the output of narrow-band filter 39, to follow any gradual shift in phase of the received signal, the signal is supplied through a delay 43 and phase selector 45 to the input of the filter. The delay 43 corresponds to the integration time of the matched filter and the consequent delay in the phase detector output, which is supplied to the phase selector to pass the delayed signal either directly or phase inverted to the narrow band filter. If the phase selector inputs are rectangular, analogous to FIGS. 2 and 6 of Wozencraft, as noted in the above paragraph, because of either (1) dual filters or (2) bistable circuit at phase detector (1) input or (2) output the phase selector outputs are substantially uniform, assuming such inputs are properly synchronized to correspond to the same signal pulse intervals (although both delayed relative thereto). However, if either (or both) involve rising sawtooth characteristics, analogous to FIGS. 4 and 5 of Wozencraft, the output will involve pulses each "weighted" more heavily toward the end of (but within) such intervals; this is less desirable since phase information available at the beginning of such intervals is not utilized. The ultimate phase relation resulting from the delay must be suitable to maintain the narrow band filter output in the proper phase relation to the output of the matched filter, although a few whole cycles variation in the delay would merely reduce the effectiveness of the input through the phase selector to the narrow band filter.

The need for this delay can be eliminated as illustrated in either FIG. 2*a* or FIG. 3. In FIG. 2*a* the output of the matched filter is supplied to both the phase detector and phase selector and therefore any delay due to integration in the matched filter occurs equally in both circuits. Even if the output of the matched filter varies widely in amplitude through each mark or space period as in the case of the single filter of Wozencraft, the narrow band filter maintains a uniform output since the sidebands involved in such variations are largely outside the filter pass-band. FIG. 2*a* also illustrates the alternative storing mode noted above regarding FIG. 2 with a pair of filter elements in the matched filter rather than a flip-flop at the output of the phase detector. The details of both are illustrated in FIGS. 7 and 8, using the designations 35' and 37' for the alternative forms; the substitution of these details in the original is readily apparent from the block numbers and the waveform letters on the connecting leads. In other respects the circuit of FIG. 2*a* corresponds to FIG. 2.

Illustrative waveforms have been shown in FIG. 6. The letters identifying particular waveforms are also shown in FIGS. 2, 2*a*, 3, 7, and 8 to indicate typical waveforms which might occur at various points in such circuits, but are largely alternative since many variations are possible. In FIG. 8 the waveforms referenced show storing in the filters as described above, while in FIG. 7 the waveforms referenced show storing in the detector output as in the above-identified circuit of Wozencraft (using phase detection to respond to the phase reversal keying as distinguished from the mere on-off keying of Wozencraft). Typical waveforms within the matched filter 35 and detector 37 blocks of FIGS. 2, 2*a*, and 3 are illustrated in connection with the more detailed circuits of FIGS. 7 and 8. The basic phase detector has been separated into multiplier **253*a* and low-pass filter 253*b* merely to analyze the waveform development; if the resistance shown dotted in 253*b* is only the inherent resistance of 253*a* the waveforms designated between 253*a* and 253*b*** would have no actual existence, although the output would be the same.

In FIG. 3, a somewhat different approach is made to the problem of providing the local source of phase controlled signal, by using a narrow band oscillator 51. The matched filter output is supplied to the phase detector 37' as in FIG. 2 and also through a 90° phase shifter 53 to a similar quarter phase detector 57 supplied from the same oscillator. It would be obvious that the phase shifter could be in the lead from the oscillator rather than that from the matched filter 35'. Any deviation from exact phase coincidence (or phase opposition) in phase detector 37' would be accompanied by a substantial variation of one or the other polarity in the normally low output of quarter phase detector 57. This is sensitive to small variations in phase since the in-phase components of nearly normal vectors are dependent on the sine of the lead or lag angle, which is substantially proportional to the angle until it becomes fairly large. The phase quadrature of the inputs at proper phase position provides zero output since no components are of the same or opposite phase. The outputs of both the phase detector and quarter phase detector are supplied to the lag-lead detector 59. The output of this lag-lead detector 59 would be a reversible D.C. voltage which is supplied to integrator 61 (essentially only a capacitor) to eliminate any rapid fluctuations and the average value is then supplied to the narrow band oscillator 51 to maintain the correct phase of its output voltage. The expression "narrow band" in reference to filter 39 and oscillator 51 is used to indicate that a circuit is highly stable in frequency but subject to some slight corrections which can compensate for variations in phase. In both cases this provides a highly stable local source of reference frequency with energy content obtained from the receiver power supply thru (1) amplifier or (2) oscillator, and phase position determined from the received signal by either (1) mere amplification or (2) phase detection and automatic frequency control.

It will be understood that the output polarity of the quarter phase detector would depend on the lag or lead of the signals relative to the 0° or 180° positions and also on whether this lag or lead is relative to the 0° position or the 180° position, which would be identified by the output of the primary phase detector 37 and can be used to resolve the ambiguity in output of detector 57. In other words, there would be one polarity and amplitude of the quarter phase detector output for 10° or 170°, the opposite polarity for 190° or 350°, but the lag lead detector would reverse such polarities (near 180°) corresponding to the 170° and 190° positions, thus giving the same resultant polarity for the "lead" angles 170° and 350° and the other polarity for the "lag" angles 10° and 190°. It will be apparent that the output amplitude of the phase detector decreases if the phase relations vary too widely from coincidence or opposition. This may be an actual advantage in the phase selector of FIG. 2 or lag-lead detector of FIG. 3 since any correction applied to the narrow band circuits would be reduced accordingly, tending to minimize improper correction due to random signals.

The designations of several elements are intended to show their purpose rather than structure, particularly in the case of balanced modulator circuits, which can perform various apparently different functions from the same circuit, depending only on the signals applied, and usually suitable filtering of the output. When supplied with equal frequency inputs the circuit performs as a phase detector 37 or 57. When supplied with a high frequency and a low frequency rectangular random wave the latter serves to select the high frequency or a phase reversal thereof in accordance with the low frequency wave as in phase selector 45. When supplied with two low frequency rectangular random waves the output may be a reversible D.C., serving as a lag-lead detector 59 in the circuit of FIG. 3. Terman "Electronic and Radio Engineering," McGraw-Hill, Fourth edition, page 540, Fig. 15–13(*b*) shows a suitable simple modulator, which actually balances both inputs from the output. Much more detailed analysis of operation appears in Radiation Laboratory Series, vol. 19, Waveforms, Chance et al., McGraw-Hill, 1949, pages 413–418. Inputs may be excluded from the output by filtering and/or balancing, depending on frequency range and other parameters of the operation.

The foregoing has illustrated suitable applications of the invention in the case of binary phase shift or phase reversal keying. It will be readily apparent that the techniques would be equally applicable with quaternary or 90° phase shift keying. Some of the same techniques may also be involved in the frequency shift keying systems to be illustrated below.

In FIG. 4 the frequency shift keyed signals at high frequency are supplied through antenna 71 and receiver 73, in which they would normally be converted to a moderate frequency band, to mark filter 75 and space filter 77 for separating the two frequencies. A local oscillator and divider circuit 79 provides further signals of suitable frequency for mixing in converters 81 and 83 with the mark and space signals to provide the same frequency and phase in the output of both converters. Using the center frequency between the frequencies of mark and space signals for both converters provides for a simple relation of the frequencies with the outputs of the converters and the narrow band filters operated at one-half the difference between the frequencies of the mark and space signals. Since either one or the other signal is on at all times this output frequency will be continuously available. These outputs are supplied to a narrow band filter 85 which maintains the necessary synchronizing signal in suitable frequency and phase to determine the existence of actual mark or space signals at any time. In second converters 87 and 89 this synchronizing signal is again mixed with the same outputs of the local oscillator to recover signals of frequency and phase corresponding to the mark and space signals, but continuously available and of stable phase in spite of any random noise or disturbance in the received signals. The mark and space signals are supplied through matched filters 91 and 93 to the phase detectors 95 and 97 in which the data is recovered. The data output 99, normally considered as the difference between the mark and space outputs, is obtained from such detectors and corresponds to the data input to the transmitter system of FIG. 1.

In FIG. 5 similar signals are supplied through antenna 101 and receiver 103, much as in FIG. 4. The converter 105 is separately shown in this figure between the receiver 103 and the mark and space filters as it is directly involved in the operation of the invention. The mark and space filters 107 and 109, converters 111 and 113 and narrow band filter 115 also operate as in FIG. 4. However, the second converters 117 and 119 are arranged to convert the mark and space signals to a suitable frequency and phase for use in the matched filters 121 and 123 and phase detectors 125 and 127 in which they are compared with a signal from oscillator and divider 129. Using the center frequency as in FIG. 4 for the first converters, the second converter outputs also would be at such center frequency.

If converted to the same frequency and opposite phase it is quite practical to use only a single matched filter as in FIG. 5*a* in place of the two shown in FIG. 5 since the mark and space signals do not occur simultaneously. The timing required in a matched filter is normally available in the oscillator and divider circuits and would avoid the need for a separate timing circuit. The actual connection has been omitted from the drawings to avoid confusion with features directly related to the invention.

The origin of the data output 131 in FIG. 5 would correspond to that of FIG. 4 while FIG. 5*a* would provide the same output, altho the difference between the two signals would be determined in a single phase detector. In order to correct for phase variation in FIG. 5 an additional output is provided from the oscillator and divider at the same frequency as that of the narow band filter. This output is compared to that of the narrow band filter in phase discriminator 133 the output of which is connected through frequency control 135 to the narrow band oscillator 137 which corrects the operation of converter 105 for any phase variations in the transmission medium or the circuitry.

Further variations of the invention will be apparent to those skilled in the art.

What is claimed is:

1. A receiving system for a succession of pulse signals of a plurality of differing characteristics selected according to a digital code to convey intelligence, comprising, an output circuit, means selectively responsive only to pulses of the predetermined frequency, length, and transition times corresponding to the intelligence signals to be received to provide intermediate signals of said frequency and corresponding phase, further means selectively responsive only to the frequency and phase of said intermediate signals to produce in said output circuit a corresponding plurality of states, any changes between such states occurring at said transition times, said further means including a local source of signals sustained over a period of many pulse signals at a substantially constant frequency and phase corresponding to that of the signals to be received, said output circuit therefore being responsive to received signals as limited by both said selectively responsive means, and means responsive to the frequency and phase of received signals to modify the frequency and phase relation of the sustained signals to correspond more closely to the frequency and phase of further intelligence signals to be received.

2. A receiving system for a succession of pulse signals of a plurality of differing characteristics selected according to a digital code to convey intelligence, comprising, an output circuit, means selectively responsive only to pulses of the predetermined frequency, length, and transition times corresponding to the intelligence signals to be received to provide intermediate signals of said frequency and corresponding phase, further means selectively responsive only to the frequency and phase of said intermediate signals to produce in said output circuit a corresponding plurality of states, any changes between such states occurring at said transition times, said further means including a local source of signals sustained over a period of many pulse signals at a substantially constant frequency and phase corresponding to that of the signals to be received, said output circuit therefore being responsive to received signals as limited by both said selectively responsive means, and means responsive to received signals to modify the frequency and phase relation of the sustained signals to correspond more closely to the frequency and phase of further intelligence signals to be received.

3. A receiving system for a succession of pulse signals of the same frequency but of a plurality of differing phases selected according to a digital code to convey intelligence, comprising, an output circuit, means selectively responsive only to pulses of the predetermined frequency, length, and transition times corresponding to the intelligence signals to be received to provide intermediate signals of said frequency and corresponding phase, further means selectively responsive only to the frequency and phase of said intermediate signals to produce in said output circuit a corresponding plurality of states, any changes between such states occurring at said transition times, said further means including a local source of signals sustained over a period of many pulse signals at a substantially constant frequency and phase corresponding to that of the signals to be received, said output circuit therefore being responsive to received signals as limited by both said selectively responsive means, and means responsive to the frequency and phase of received intelligence signals to modify the frequency and phase relation of the sustained signal to correspond more closely to the frequency and phase of further intelligence signals to be received.

4. A receiving system for a succession of pulse signals of the same frequency but of a plurality of differing phases selected according to a digital code to convey intelligence, comprising, an output circuit, means selectively responsive only to pulses of the predetermined frequency, length, and transition times corresponding to the intelligence signals to be received to provide intermediate signals of said frequency and corresponding phase, further means selectively responsive only to the frequency and phase of said intermediate signals to produce in said output circuit a corresponding plurality of states, any changes between such states occurring at said transition times, said further means including a local source of signals sustained over a period of many pulse signals at a substantially constant frequency and phase corresponding to that of the signals to be received, said output circuit therefore being responsive to received signals as limited by both said selectively responsive means, said local source comprising a narrow band filter having as an input phase components of the received intelligence signals selected in accordance with the data output, said first means involving a delay in selection, and means for delaying the received signals to be selected by said data output to provide the proper phase components to said filter.

5. A receiving system for a succession of pulse signals of a plurality of differing frequencies but integrally related phase selected according to a digital code to convey intelligence, comprising, an output circuit, means selectively responsive only to pulses of the predetermined frequency, length, and transition times corresponding to the intelligence signals to be received, to provide intermediate signals of said frequency and corresponding phase, further means selectively responsive only to the frequency and phase of said intermediate signal to produce in said output circuit a corresponding plurality of states, any changes between such states occurring at said transition times, said further means including a local source of signals sustained over a period of many pulse signals at a substantially constant frequency and phase corresponding to that of the signals to be received, said output circuit therefore being responsive to received signals as limited by both said selectively responsive means, and means responsive to the frequency and phase of received intelligence signals to modify the frequency and phase relation of the sustained signals to correspond more closely to the frequency and phase of further intelligence signals to be received.

6. A receiving signal for a succession of pulse signals of a plurality of differing frequencies but integrally related phase selected according to a digital code to convey intelligence, comprising, an output circuit, means selectively responsive only to pulses of a predetermined frequency, length, and transition times corresponding to the intelligence signals to be received to provide intermediate signals of said frequency and corresponding phase, further means selectively responsive only to the frequency and phase of said intermediate signals to produce in said output circuit a corresponding plurality of states, any changes between such states occurring at said transition times, said further means including a local source of signals sustained over a period of many pulse signals at a substantially constant frequency and phase corresponding to that of the signals to be received, said output circuit therefore being responsive to received signals as limited by both said selectively responsive means, and means responsive to the frequency and phase of received intelligence signals to modify the frequency and phase relation of the sustained signals to correspond more closely to the frequency and phase of further intelligence signals to be received, said local source comprising, a narrow band filter having as an input the received intelligence signals converted to a common frequency and phase, and means to reconvert the output of said filter to sustained signals of the frequency and phase of the received intelligence signals.

References Cited in the file of this patent

UNITED STATES PATENTS 2,880,316 Wozencraft ------------ Mar. 31, 1959

OTHER REFERENCES

A.I.E.E. Transactions, vol. 78, Part I (Heald et al.), July 1957, pp. 316–319.

A.I.E.E. Transactions, vol. 78, Part I (Moiser et al.), January 1958, pp. 723–728.

Proceedings I.R.E., vol. 45 (Doelz et al.), May 1957, pp. 656–661.

Electronic and Radio Engineering, F. Terman, McGraw-Hill Book Co., 4th edition, 1955, pp. 1007–1010.